June 2, 1964     J. W. COLE ETAL     3,135,148

METHOD OF MACHINING MATERIALS

Original Filed July 30, 1956     4 Sheets-Sheet 1

Inventors
John W. Cole &
George W. Onksen

By W. C. Middleton
Attorney

Inventors
John W. Cole &
George W. Onksen
By W. C. Middleton
Attorney

June 2, 1964  J. W. COLE ETAL  3,135,148
METHOD OF MACHINING MATERIALS
Original Filed July 30, 1956  4 Sheets-Sheet 3

Inventors
John W. Cole &
George W. Onksen
By W. C. Middleton
Attorney

June 2, 1964 J. W. COLE ETAL 3,135,148
METHOD OF MACHINING MATERIALS
Original Filed July 30, 1956 4 Sheets-Sheet 4
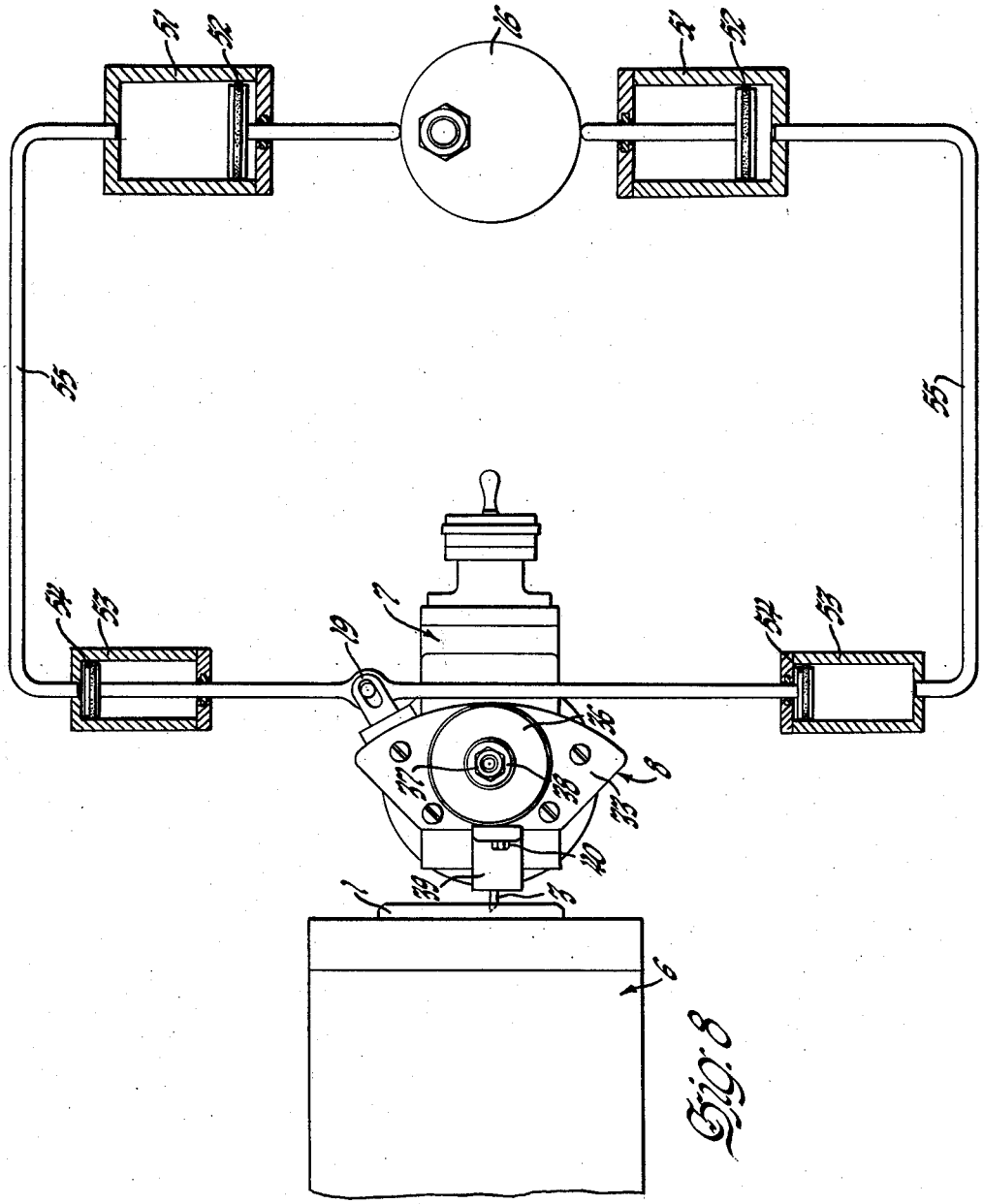
Inventors
John W. Cole &
George W. Onksen
By
W. C. Middleton
Attorney United States Patent Office 3,135,148
Patented June 2, 1964

3,135,148
METHOD OF MACHINING MATERIALS
John W. Cole, R.R. 1, Markleville, Ind., and George W. Onksen, 40 Tower Road, Anderson, Ind.
Original application July 30, 1956, Ser. No. 600,763. Divided and this application Aug. 29, 1962, Ser. No. 220,946
2 Claims. (Cl. 82—1)

This invention relates to an improved method of machining materials.

In certain type optical lenses, light beams are spread horizontally and vertically a predetermined amount by concentric rings formed on the lens. These rings are designed to present prismatic light bending surfaces causing substantially uniform illumination across the face of the lens for providing the required degree of upward and side lighting. When the lens is tilted, then the beam is also tilted which, if undesirable, can be corrected by varying the side angles of the rings. This variance of the side angles continuously with circumferential position presents a problem in the machining of a mold for the lens.

In overcoming the problem this invention contemplates a novel method of accomplishing the foregoing. By the method, arcuate grooves of a continuously varying shape are machined in a workpiece.

This application is a division of our copending application Serial No. 600,763 filed July 30, 1956, and now abandoned.

The foregoing and other objects and advantages will be more apparent from the following description and from the accompanying drawings in which:

FIGURE 8 is a view shown schematically of another modified attachment employing a closed hydraulic system for oscillating a cutting tool.

Figure 4:
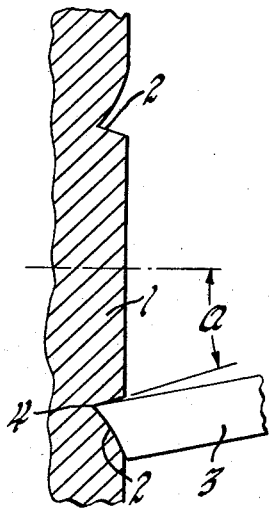
FIGURE 4 is a partial sectional view of a cutting tool in cutting relation with a workpiece.
Figure 5:
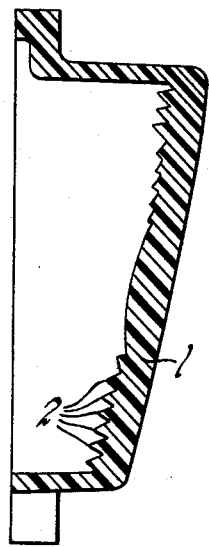
FIGURE 5 is a sectional view of a workpiece in FIGURE 4 depicting a plurality of V-shaped grooves.

To better understand the function and purpose of the invention, reference is made to FIGURES 4 and 5 of the drawings in which FIGURE 4 shows a cutting tool 3 in cutting relation with the workpiece 1 and FIGURE 5 shows a plurality of V-shaped grooves 2 in the workpiece 1. As depicted by FIGURE 4, a cutting tool 3 is fed to the desired depth into the workpiece 1 that revolves about a turning axis. Then to vary the angle A as the workpiece revolves, the cutting tool is oscillated about its cutting point 4 in a plane transverse to the direction in which the tool is fed into the workpiece. Normally in a lathe this plane will be a horizontal plane, i.e., horizontal with the machine foundation. It should be noted that cutting tool clearance angles are not a problem with the oscillation.

Figure 1:
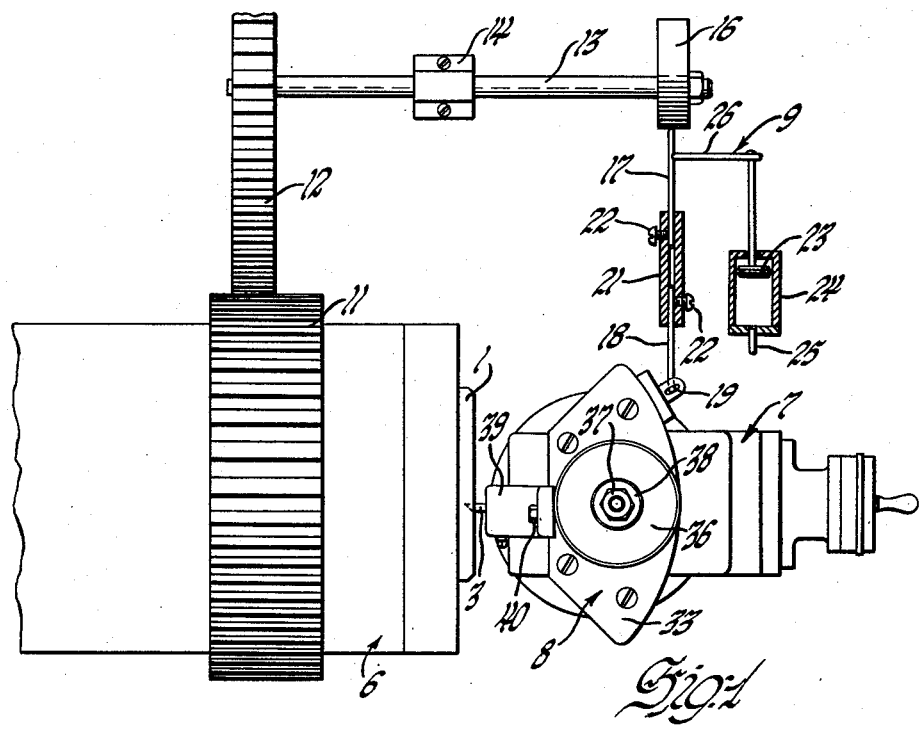
FIGURE 1 is a view shown schematically of a machine tool attachment embodying the principles of the invention for oscillating a cutting tool.

To produce this oscillatory movement of the cutting tool 3 about its cutting point 4, an embodiment of the invention is illustrated in FIGURE 1 which is installed as an attachment to a conventional lathe having a headstock 6 to rotate a spindle (not shown) for holding the workpiece 1 and a lathe compound 7 which feeds a cutting tool into a workpiece in a well known manner. The attachment comprises a cutting tool supporting member mechanism 8 mounted on the compound 7 for oscillatory movement by an actuating means 9 operated by gearing including a drive gear 11 and a driven gear 12. The drive gear 11 is suitably mounted for rotation with the lathe spindle and meshes with the driven gear 12 connected to an end of a countershaft 13 journaled in a bearing 14.

The guide means 9 for oscillating the cutting tool supporting member 8 includes a guide surface such as an adjustable eccentric cam 16 mounted opposite the driven gear 12 on the countershaft 13, a follower link 17 engaging a surface of the cam 16, a connecting link 18 pivotally connected to the supporting member mechanism 8 at 19 and an adjustable slip joint 21 interconnecting the links 17 and 18. Adjustment of this eccentric cam 16 is made simply by varying the eccentricity or offset of the cam relative to rotational axis of the shaft 13. When the cam 16 is drivingly rotated, oscillatory movement is transferred to the supporting member mechanism 8, such movement being controlled by the adjustment of the slip joint 21. To make this adjustment set screws 22 are loosened and the distance between the cam 16 and the connection 19 is varied to permit cutting different diameter rings. Rotation of the eccentric cam 16 and, consequently, the oscillation of the supporting member mechanism 8 will be synchronized with that of the workpiece 1 in accordance with gear ratios selected for the gears 11 and 12; for example, if the gears provide a one to one ratio, then the cam 16 would revolve once with each rotation of the workpiece 1.

For constantly urging the follower link 17 against the surface of the cam 16, a piston 23, slidably mounted within a cylinder 24, is employed which receives pressure fluid through a conduit 25 from a source (not shown). Pressure fluid in the cylinder will constantly act on the piston 23 and through a follower link arm 26 interconnecting the piston 23 and the link 17 will hold the end of link 17 against the surface of the cam 16.

Figure 2:
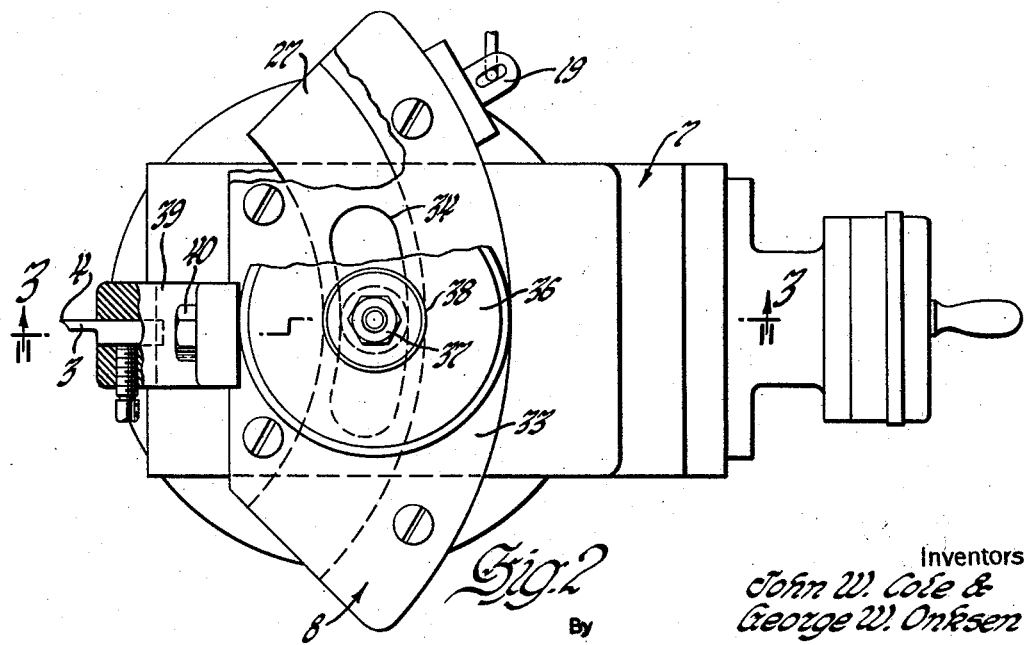
FIGURE 2 is an enlarged view of a cutting tool supporting member employed to the FIGURE 1 embodiment.
Figure 3:
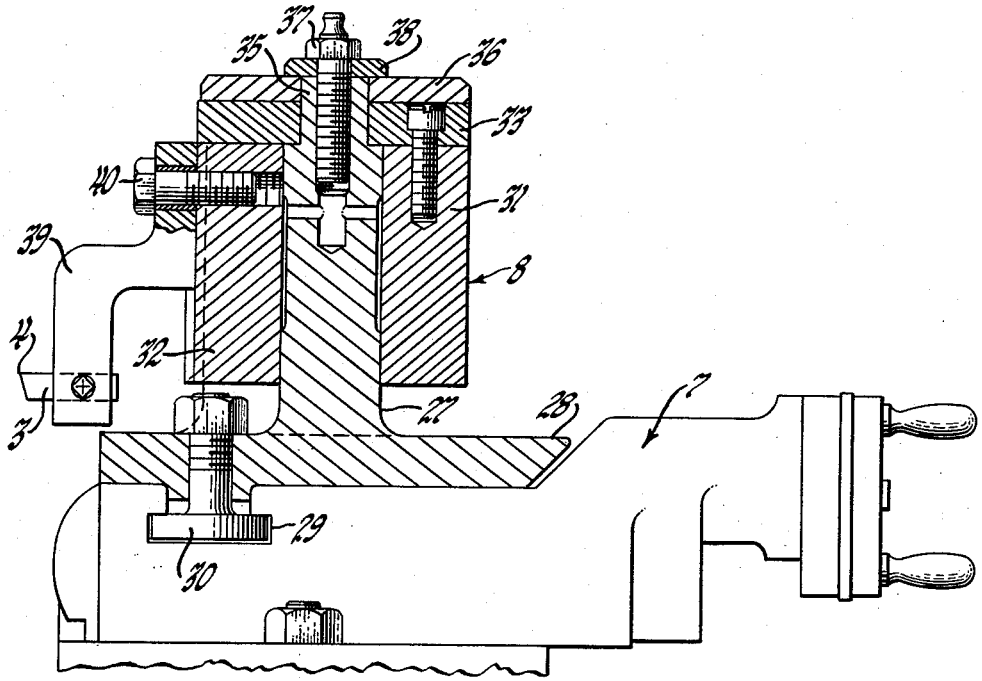
FIGURE 3 is a partial sectional view of the supporting member in FIGURE 2.

FIGURES 2 and 3 illustrate in enlargement of the details of the cutting tool supporting mechanism 8. This mechanism is made up of an arcuate shaped guide member 27 upstanding from a base 28 which is mounted for transverse movement on the lathe compound 7. This transverse movement, which may be utilized for so positioning the cutting tool 3 as to determine the diameter of the groove to be cut, comprises a T-slot 29 in the compound 7 in the upper part of which slot a tongue depending from the base 28 fits. In addition, a T-bolt 30, the head of which fits in the slot 29 and the shank of which passes through the base 28, is used for clamping the base in any of its adjusted transverse positions. Of course, after the mechanism 8 is clamped to the lathe compound 7, different movements of the compound can be made in the conventional manner; for example, by the lathe table (not shown).

In conjunction with the arcuate shaped guide 27, use is made of a slide member comprising spaced vertical members 31 and 32 which have opposite surfaces to fit the opposite surfaces of the guide 27. In other words, these opposite surfaces of the parts 31 and 32 are formed as arcs of circles, the center of which is common to the center of the side walls of guide 27. The two members 31 and 32 are held in assembly by being bolted or otherwise secured to a horizontal plate 33. The extent of movement of the slide member is determined by the motion imparted thereto from cam 16 through links 17 and 18 and adjustable slip joint 21. Maximum limits to the movement of the slide relative to the compound 7 are determined by an arcuate slot 34 in the plate 33 which slot has extending therethrough a boss extension 35 on the guide member 27. It is understood that the degree of movement of the slide for cutting the various grooves depends on the groove profile desired. Also, it will be noted that the boss 35 of the cylindrical shape is of smaller diameter than the width of the guide 27 so that horizontal surfaces are formed on the top of guide 27 on which the plate 33 is supported for oscillatory motion. The plate 33 must be free to slide relative to the guide 27 but must not be capable of tilting or appreciable vertical motion and such undesired motions are prevented by the use of a retaining disk 36 which can be clamped on top of plate 33 by the oil feed bolt 37 bearing on washer 38. The oil feed bolt 37 has its upper extremity shaped to receive a pressure lubricant fitting and it communicates with cross-lubrication passages (shown in FIGURE 3) in the guide 27. The cutting tool 3, the point 4 of which is the axis of rotation for the supporting member mechanism 8 on the guide member 27, is positioned by a holder 39 secured to the vertical member 32 by a bolt 40.

Figure 6:
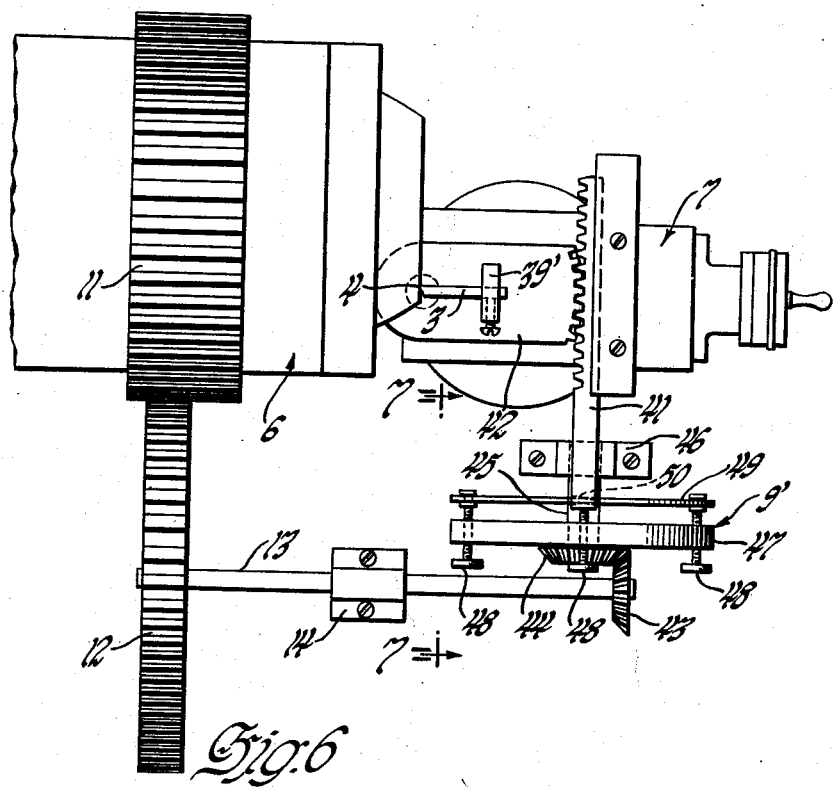
FIGURE 6 is a view shown schematically of a modified attachment employing a rack and a segmental gear for creating oscillation of a cutting tool.
Figure 7:
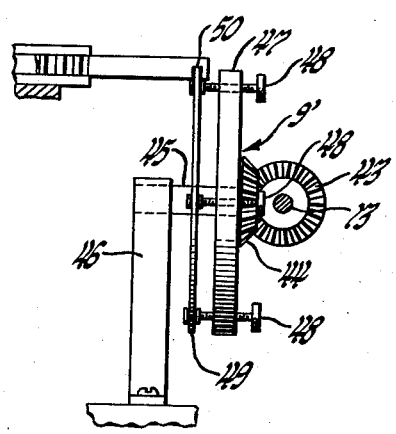
FIGURE 7 is a view of the FIGURE 6 adjusting means demonstrating the connection between the rack and a flexible ring.

In FIGURE 6, a modified attachment is depicted employing a suitably mounted slidable rack gear 41 meshing with a segmental gear 42 pivotably supported on the compound 7 at the point 4 of the cutting tool 3 in a holder 39' attached to the segmental gear 42. The reciprocating longitudinal movement of the rack gear 41 is created by a guide means 9' driven from the lathe spindle by the drive gear 11 and the driven gear 12. For driving this guide means, an input bevel gear 43 is affixed to the countershaft 13 opposite the driven gear 12 for engagement with an output bevel gear 44 drivingly connected to a stub shaft 45 journaled in a support bearing 46. An annular plate 47 is connected to the stub shaft 45 and has attached thereon by a plurality of adjusting screws 48 a flexible annular ring 49. These adjusting screws 48, when turned, distort the flexible ring 49 to any desired shape permitting different diameter rings to be cut and also allowing each ring to be cut differently, i.e., at the same circumferential position on each ring a different shape groove can be cut. As depicted in FIGURE 7, the rack gear 41 includes a notch 50 for receiving a circumferential part of the flexible ring 49. Therefore, as the plate 47 is revolved, depending on the distortion in the flexible ring 49, the rack gear 41 will be reciprocated in accordance with this predetermined distortion, hence oscillating the segmental gear 42 about the pivot point 4.

Another modification of the invention is illustrated in FIGURE 8 in which a closed hydraulic system is employed for oscillating the cutting tool supporting member mechanism 8 as previously described in connection with FIGURES 1, 2, and 3. This closed system is symmetrical, in that identical oppositely disposed units are arranged on each side of the supporting member mechanism 8. Each unit of the system includes a cylinder 51 having slidably mounted therein a cam actuated piston 52 and a cylinder 53 having slidably mounted therein a supporting member actuating piston 54 with a fluid conduit 55 connected to each of the cylinders 51 and 53. When the cam 16 is revolved, as demonstrated in FIGURE 1, the pistons 52 are actuated, one inwardly and the other outwardly, displacing fluid in each unit to cause the other pistons 54 to be also actuated and again, one inwardly and the other outwardly. Since the pistons 54 are connected to the supporting member mechanism 8 at 19, the cutting tool 3 will be oscillated as described before. As demonstrated, with the cam 16 in the position shown, the lower unit of the system will cause the supporting member mechanism 8 to be moved to the position shown. Then as the cam 16 revolves to the opposite position, fluid will be displaced in the upper unit of the system moving the supporting member mechanism 8 to the position opposite that shown.

The grooves 2, cut in the surface of the workpiece with each of the FIGURE 1, 6, and 8 arrangements, will normally appear as a series of circles or rings at the depth of tool contact between the cutting tool 4 and the workpiece since oscillation is always about the cutting point 4. However, the width of each groove 2, viewed, will, of course, vary at different points as the angle A is changed.

This invention is to be limited only by the following claims:

1. The method of cutting a series of arcuate grooves in a workpiece comprising the steps of rotating the workpiece about the axis thereof, positioning the cutting tool relative to the workpiece so that the cutting point is embedded a predetermined distance within the workpiece, and oscillating the cutting tool in synchronism with the rotation of the workpiece about the cutting point of the cutting tool so as to vary the side angles and accordingly the shape of the arcuate grooves.

2. The method of machining a workpiece comprising the steps of rotating the workpiece about an axis thereof, positioning a cutting tool in close proximity to the workpiece so as to cut an arcuate groove of a predetermined depth in a surface that is transverse to the rotational axis of the workpiece, oscillating the cutting tool about its cutting point synchronously and continuously with rotation of the workpiece so as to vary the side angles of the arcuate groove made by the cutting tool in the workpiece, and repositioning the cutting tool relative to the workpiece so as to cut successive grooves while maintaining the oscillation the same.

References Cited in the file of this patent

UNITED STATES PATENTS

| 1,179,556 | Pribnow | Apr. 18, 1916 |

FOREIGN PATENTS

| 18,150 | Great Britain | 1900 |
| 486,012 | France | Dec. 7, 1917 |

UNITED STATES PATENT OFFICE
CERTIFICATE OF CORRECTION

Patent No. 3,135,148

June 2, 1964

John W. Cole et al.

It is hereby certified that error appears in the above numbered patent requiring correction and that the said Letters Patent should read as corrected below.

In the heading to the printed specification, lines 5 to 7, for "Original application July 30, 1956, Ser. No. 600,763. Divided and this application Aug. 29, 1962, Ser. No. 220,946" read -- Continuation of application Ser. No. 600,763, July 30, 1956. This application Aug. 29, 1962, Ser. No. 220,946 --; column 1, line 27, for "division" read -- continuation --.

Signed and sealed this 10th day of November 1964.

(SEAL)
Attest:

ERNEST W. SWIDER
Attesting Officer

EDWARD J. BRENNER
Commissioner of Patents